D. M. MEFFORD.
Sealing Fruit-Buckets.
No. 148,733. Patented March 17, 1874.
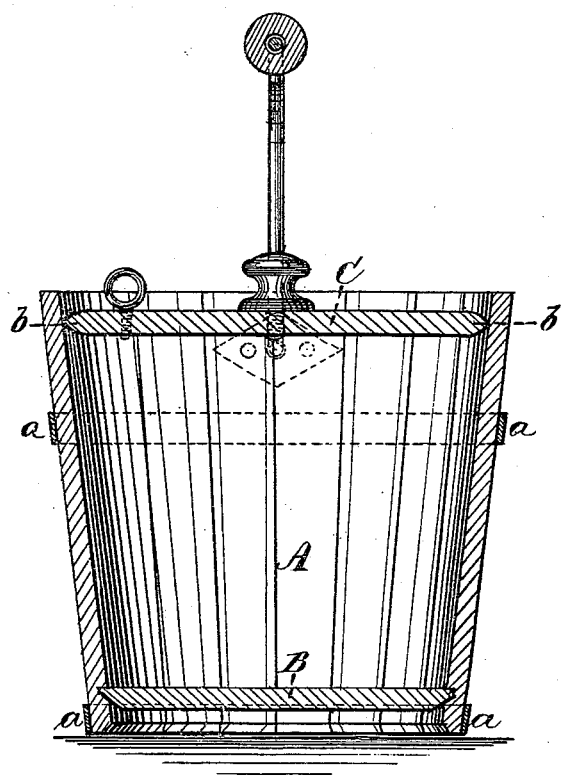
WITNESSES.
P. C. Dieterich.
Aib Miloe
INVENTOR
David M. Mefford.
per C. H. Watson & Co.
ATTORNEYS.

UNITED STATES PATENT OFFICE.

DAVID M. MEFFORD, OF TOLEDO, OHIO, ASSIGNOR TO AMERICAN INVENTION COMPANY, OF ST. LOUIS, MISSOURI.

IMPROVEMENT IN SEALING FRUIT-BUCKETS.

Specification forming part of Letters Patent No. 148,733, dated March 17, 1874; application filed February 26, 1874.

*To all whom it may concern:*

Be it known that I, DAVID M. MEFFORD, of Toledo, in the county of Lucas and State of Ohio, have invented certain new and useful Improvements in Fruit-Packing; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The nature of my invention consists in the construction of a self-sealing vessel or package for putting up fruit or other articles containing more or less liquid, as will be hereinafter more fully set forth.

The accompanying drawing represents a vertical section of my invention.

A represents a vessel, made of wooden staves in such a manner as to be more or less flaring, and provided with exterior hoops $a$ and a bottom, B, permanently attached thereto. The interior surface of the vessel A, from the bottom upward, is perfectly straight and smooth, as shown. C represents the lid, made of suitable size to fit within the upper end of the vessel A. The edge of this lid is beveled on both sides, so as to form a V-point, $b$.

After the fruit or other article to be packed in the vessel has been placed therein, the lid C is pressed down in the vessel, and, as it comes in contact with the liquid of the article contained in the vessel, it becomes wet, and swells or expands so powerfully as to indent its edge $b$ into the sides of the vessel, and make a shallow groove therein, thus forming a perfect water-tight joint, and one that will admit no air to the interior of the vessel.

Having thus fully described my invention, what I claim as new, and desire to secure by Letters Patent, is—

The process of sealing vessels or packages in packing fruit, forming a self-sealing device, by a beveled V-point, $b$, of a lid, C, and flaring vessel A, substantially as and for the purpose herein specified.

In testimony that I claim the foregoing I have hereunto set my hand this 23d day of February, 1874.

DAVID M. MEFFORD.

Witnesses:
 JAS. J. FRENCH,
 JAMES L. CALDWELL.